US010853143B2

(12) United States Patent
Schiff et al.

(10) Patent No.: US 10,853,143 B2
(45) Date of Patent: Dec. 1, 2020

(54) AUTOMATIC SEGMENTATION OF DATA-CENTER APPLICATIONS

(71) Applicant: Guardicore Ltd., Tel Aviv (IL)

(72) Inventors: Liron Schiff, Jerusalem (IL); Ariel Zeitlin, Kfar Saba (IL); Ofri Ziv, Herzliya (IL)

(73) Assignee: GUARDICORE LTD., Tel Aviv (IL)

( * ) Notice: Subject to any disclaimer, the term of this patent is extended or adjusted under 35 U.S.C. 154(b) by 206 days.

(21) Appl. No.: 15/911,217

(22) Filed: Mar. 5, 2018

(65) Prior Publication Data
US 2018/0260252 A1 Sep. 13, 2018

Related U.S. Application Data

(60) Provisional application No. 62/469,136, filed on Mar. 9, 2017.

(51) Int. Cl.
*G06F 8/61* (2018.01)
*G06F 9/455* (2018.01)
*G06F 9/50* (2006.01)

(52) U.S. Cl.
CPC .............. *G06F 9/5038* (2013.01); *G06F 8/61* (2013.01); *G06F 9/45533* (2013.01); *G06F 9/505* (2013.01); *G06F 9/5061* (2013.01); *G06F 9/5083* (2013.01)

(58) Field of Classification Search
CPC ...... G06F 9/5038; G06F 8/61; G06F 9/45533; G06F 9/505; G06F 9/5083
See application file for complete search history.

(56) References Cited

U.S. PATENT DOCUMENTS

2007/0043703 A1\* 2/2007 Bhattacharya .......... G06F 16/24
2016/0359705 A1\* 12/2016 Parandehgheibi .... G06F 16/235
2018/0176252 A1\* 6/2018 Nimmagadda ......... H04L 63/20

OTHER PUBLICATIONS

Iliofotou et al. Profiling-by-Association: A Resilient Traffic Profiling Solution for the Internet Backbone. [online] ACM., pp. 1-12. Retrieved From the Internet <https://dl.acm.org/doi/pdf/10.1145/1921168.1921171> (Year: 2010).*

\* cited by examiner

*Primary Examiner* — Emerson C Puente
*Assistant Examiner* — Jonathan R Labud
(74) *Attorney, Agent, or Firm* — Kligler & Associates Patent Attorneys Ltd

(57) ABSTRACT

An apparatus includes an interface and a processor. The interface is configured to receive attributes of communication connections of multiple workloads running in a computing system. The processor is configured to automatically segment the multiple workloads into groups based on the attributes of the communication connections, wherein the workloads in each group collectively run a respective application.

26 Claims, 5 Drawing Sheets

AUTOMATIC SEGMENTATION OF DATA-CENTER APPLICATIONS

CROSS-REFERENCE TO RELATED APPLICATIONS

This application claims the benefit of U.S. Provisional Patent Application 62/469,136, filed Mar. 9, 2017, whose disclosure is incorporated herein by reference.

FIELD OF THE INVENTION

The present invention relates generally to computer-system management, and particularly to methods and systems for automatic segmentation of computer-system applications.

BACKGROUND OF THE INVENTION

Data centers, as well as other types of computing systems, commonly run multiple applications. Each application is implemented by one or more virtual or physical machines. Large and complex data centers, involving large numbers of interconnected machines, are extremely difficult to configure, manage and secure.

SUMMARY OF THE INVENTION

An embodiment of the present invention that is described herein provides an apparatus including an interface and a processor. The interface is configured to receive attributes of communication connections of multiple workloads running in a computing system. The processor is configured to automatically segment the multiple workloads into groups based on the attributes of the communication connections, wherein the workloads in each group collectively run a respective application.

In some embodiments, for each communication connection, the attributes consist of a source workload, a destination workload and a destination port number.

In some embodiments, the processor is configured to segment the workloads by clustering the workloads into tiers, each tier including workloads performing a same role within an application, and grouping the tiers to form the groups. In some embodiments, the processor is configured to represent the computing system by a graph, which includes nodes that initially represent the workloads and edges that initially represent the communication connections, and to cluster the workloads into the tiers by iteratively clustering the nodes of the graph.

In an embodiment, the processor is configured to calculate (i) similarity measures that quantify an extent to which pairs of the nodes have significant connections with same neighbor nodes using a same destination port number, and (ii) variance measures that quantify an extent to which nodes add significance to the similarity measures, and to cluster the nodes into the tiers based on the similarity measures and the variance measures. In an embodiment, following clustering of the workloads into the tiers, the processor is configured to group the tiers to form the groups by assigning respective weights to the edges of the graph, and grouping the tiers based on the weights.

In a disclosed embodiment, the apparatus further includes multiple software agents, which are installed in the computing system and are configured to monitor the communication connections and to send the attributes to the processor. In another embodiment, the processor is configured to formulate a security policy for the computing system based on segmentation of the workloads into the applications. In an alternative embodiment, the processor is configured to present segmentation of the workloads into the applications to an operator.

There is additionally provided, in accordance with an embodiment of the present invention, a method including receiving attributes of communication connections of multiple workloads running in a computing system. The multiple workloads are automatically segmented into groups based on the attributes, wherein the workloads in a given group collectively run a respective application. Segmentation of the workloads into the groups is acted upon.

There is further provided, in accordance with an embodiment of the present invention, a computer software product, the product including a tangible non-transitory computer-readable medium in which program instructions are stored, which instructions, when read by a processor, causes the processor to receive attributes of communication connections of multiple workloads running in a computing system, and to automatically segment the multiple workloads into groups based on the attributes of the communication connections, wherein the workloads in each group collectively run a respective application.

The present invention will be more fully understood from the following detailed description of the embodiments thereof, taken together with the drawings in which:

DETAILED DESCRIPTION OF EMBODIMENTS

Overview

Figure 1:
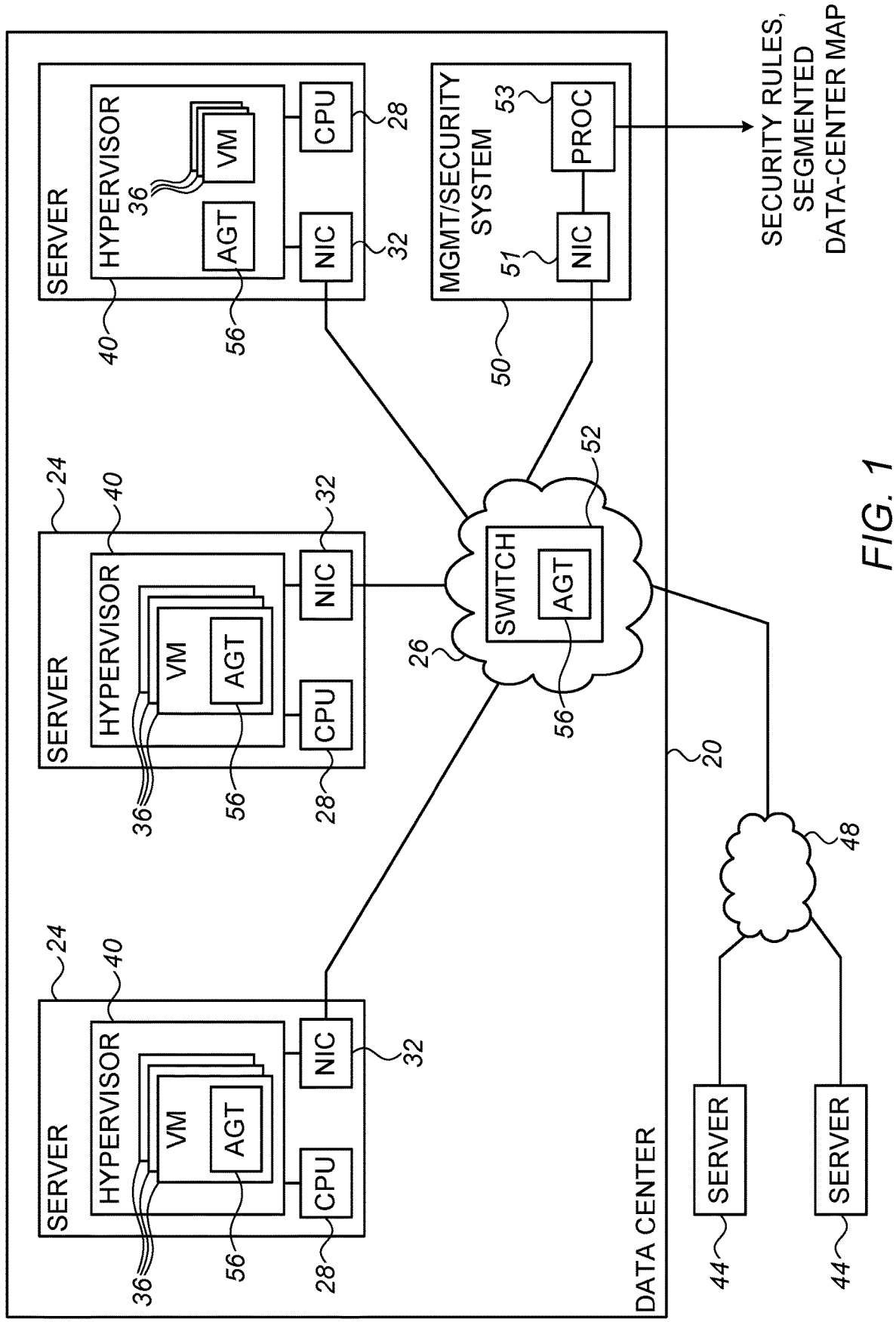
FIG. 1 is a block diagram that schematically illustrates a data center, in accordance with an embodiment of the present invention.

Data centers typically run multiple applications, such as electronic commerce sites, general Web sites, and various data processing applications. Each application is implemented by multiple workloads, e.g., Virtual Machines (VMs), which run on the physical computers of the data center. An application is often partitioned into tiers, each tier comprising one or more workloads having a particular role or functionality within the application. Common examples of tiers, which are used as building blocks of applications, comprise Web servers, application servers, databases and load balancers.

Embodiments of the present invention that are described herein provide methods and systems for automatically segmenting a computing system, e.g., a data center, into applications. The disclosed techniques typically involve a two-stage process, which initially clusters workloads into tiers, and then groups tiers into applications. In the present context, the term "segmentation" refers to partitioning of the computing system into tiers and applications. The results of the segmentation process can be used for any purpose, e.g., for improved visualization of the system structure to a human operator, or for formulation of security policies.

In some embodiments, a processor (e.g., in a management or security system) carries out the disclosed segmentation process based on monitoring of communication connections between workloads. The embodiments described herein refer mainly to Transmission Control Protocol (TCP) connections, but other connections, e.g., User Datagram Protocol (UDP) connections, can also be considered. In some embodiments the segmentation is performed exclusively based on information derived from monitoring of communication connections. Alternatively, the process may also be assisted by a-priori knowledge regarding the data center.

The process typically begins with the processor collecting information regarding communication connections from multiple software agents installed in the data center. For each monitored connection, the agents record the source workload, the destination workload, and the destination port number used in the connection. The inventors have found that the destination port number is highly effective in characterizing tiers and applications. One reason is that, in many cases, the destination port number is indicative of the type of protocol used over the connection. Even if not uniquely indicative of the protocol, the destination port number is usually static for a given service, in contrast to the source port number that often varies from one session to another.

The processor uses the information collected from the agents to construct a directed and annotated graph of the data center. Initially, each node of the graph represents a workload, and each edge represents one or more connections on a certain destination port.

The processor begins the segmentation process by iteratively clustering nodes of the graph, until each node represents an entire tier. In this iterative process, the processor considers two interrelated properties of the nodes, referred to as similarity and variance. Similarity is specified between pairs of nodes. Variance is specified per node and destination port number. The variance of a node and port is also specified separately for the connections in which the node serves as a source, and for the connections in which the node serves as a destination.

The similarity between two nodes is an estimate of the extent to which the nodes have significant connections with the same neighbor nodes using the same destination port number. Highly similar nodes are regarded as likely to belong to the same tier within an application. The variance of a node and port is an estimate of the "noise level" of this node and port. The variance is thus inversely proportional to the significance of this node and port to the similarity calculation.

One typical example of a high-variance node is a node that provides some infrastructure service to multiple applications, e.g., an antivirus or domain controller. Such a node is typically connected to many neighbor nodes using the same destination port number. Nevertheless, these connections do not add significance to the similarity between the neighbor nodes. In other words, the fact that two nodes communicate with an infrastructure node using the same destination port number does not mean they are genuinely similar. When estimating similarities for the sake of clustering nodes into tiers, the processor typically assigns a small weight, if any, to noisy node ports.

In the iterative clustering process, the processor calculates the similarities and variances, and merges together nodes that are sufficiently similar given the variances. At the end of the process, e.g., when no nodes are sufficiently similar to be merged, the processor regards each node as representing a respective tier. In some cases, nodes may be identified as tiers only after their neighbors have been grouped into tiers.

The processor then proceeds to group the nodes (now representing tiers) into groups that represent applications. Typically, the processor assigns weights to the edges of the graph (i.e., to the connections between tiers). The weights may depend, for example, on the previously calculated variances, on the number of original edges (individual connections) merged to form the edge being considered, and on the number of original nodes (individual workloads) merged to form the nodes connected by the edge. The processor groups the nodes (tiers) into applications based on the weights, e.g., by comparison to a threshold or using a more complex clustering algorithm.

The resulting segmentation of the data center is a powerful tool that can be used for various purposes, e.g., for formulating security policies or for general-purpose management. Several examples and implementations of the disclosed technique are described below.

System Description

FIG. 1 is a block diagram that schematically illustrates a computing system, in the present example a data center 20, in accordance with an embodiment of the present invention. Data center 20 comprises multiple physical computers, in the present example servers 24, which run multiple workloads, in the present example Virtual Machines (VMs) 36.

The description that follows refers mainly to a data center that runs VMs, as a non-limiting example for the sake of clarity. In alternative embodiments, the disclosed techniques can be used in any other suitable computing system, and with any other suitable types of workloads. The physical computers in the computing system may comprise, for example, servers, workstations and/or any other suitable type of computer. The workloads running on the physical computers may comprise, for example, VMs, physical machines, processes and/or containers. A workload is typically identified by a unique identifier, e.g., an IP address, a computer name or any other suitable identifier. Identifiers may be assigned to workloads, for example, by a monitoring agent or a data-center orchestration service.

In the embodiment of FIG. 1, each server 24 comprises physical resources such as a Central Processing Unit (CPU) 28, also referred to as a processor, a memory such as Random Access Memory (RAM—not shown), a Network Interface Controller (NIC) 32, and persistent storage (e.g., disk—not shown).

CPU 28 of each server 24 runs a hypervisor 40 that is configured to host one or more VMs 36. Hypervisor 40 serves as a virtualization layer that allocates physical resources (e.g., CPU, storage, memory and network resources) to the VMs it hosts. Hypervisor 40 may comprise, for example, ESXi, QEMU-KVM, Xen, or any other suitable type of hypervisor.

Servers 24 are interconnected by a communication network 26, e.g., a Local-Area Network (LAN). In some embodiments, network 26 comprises one or more network switches 52. VMs 36 running on different servers 24 may thus communicate with one another via network 26.

In some embodiments, VMs 36 may also communicate with servers 44 that are external to the data center. For this purpose, data center 20 is connected to an external communication network 48, e.g., an enterprise LAN or a Wide-Area Network such as the Internet.

In some embodiments, data center 20 further comprises a management/security system 50, which carries out various management and/or security tasks. Among other tasks, system 50 automatically segments the various VMs 36 into tiers and applications, using methods that are described in detail herein. System 50 may act upon the segmentation results in various ways, e.g., it may formulate security rules, or it may present a segmented map of the data center, with the applications and tiers and the connections between them, to an operator. System 50 comprises a NIC 51 for communicating over network 26, and a processor 53 that carries out the disclosed techniques.

In some embodiments, system 50 segments the VMs into tiers and applications based on monitoring of network communication traffic. The monitoring process is also described in detail further below. Typically, multiple software agents 56 are installed at various points in data center 20. Agents 56 record relevant parameters of communication connections, and send the information to processor 53 of system 50.

Agents 56 may be installed at various locations, as can be seen in the figure. Some agents 56 may be installed inside certain VMs 36. Other agents may be installed in certain hypervisors 56, for example as dedicated VMs. Yet other agents 56 may be installed in one or more switches of network 26. Other suitable locations can also be used. For example, agents may also be installed on (physical or virtual) external servers 44.

The configurations of data center 20, servers 24 and system 50, shown in FIG. 1, are example configurations that are depicted purely for the sake of conceptual clarity. In alternative embodiments, any other suitable configurations can be used. FIG. 1 shows only three servers for simplicity, but real-life systems often comprise a large number of servers. The disclosed techniques can be used with any desired number of servers, and even with a system that comprises only a single server. The disclosed techniques are not limited to virtualized environments, and can be used, for example, with purely physical machines.

The different elements shown in FIG. 1 may be implemented using software, using suitable hardware, such as one or more Application-Specific Integrated Circuits (ASIC) or Field-Programmable Gate Arrays (FPGA), or using a combination of hardware and software elements.

In some embodiments, CPUs 28 (on which hypervisors 40 run) and processor 53 comprise programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Data-Center Tiers and Applications

Figure 2:
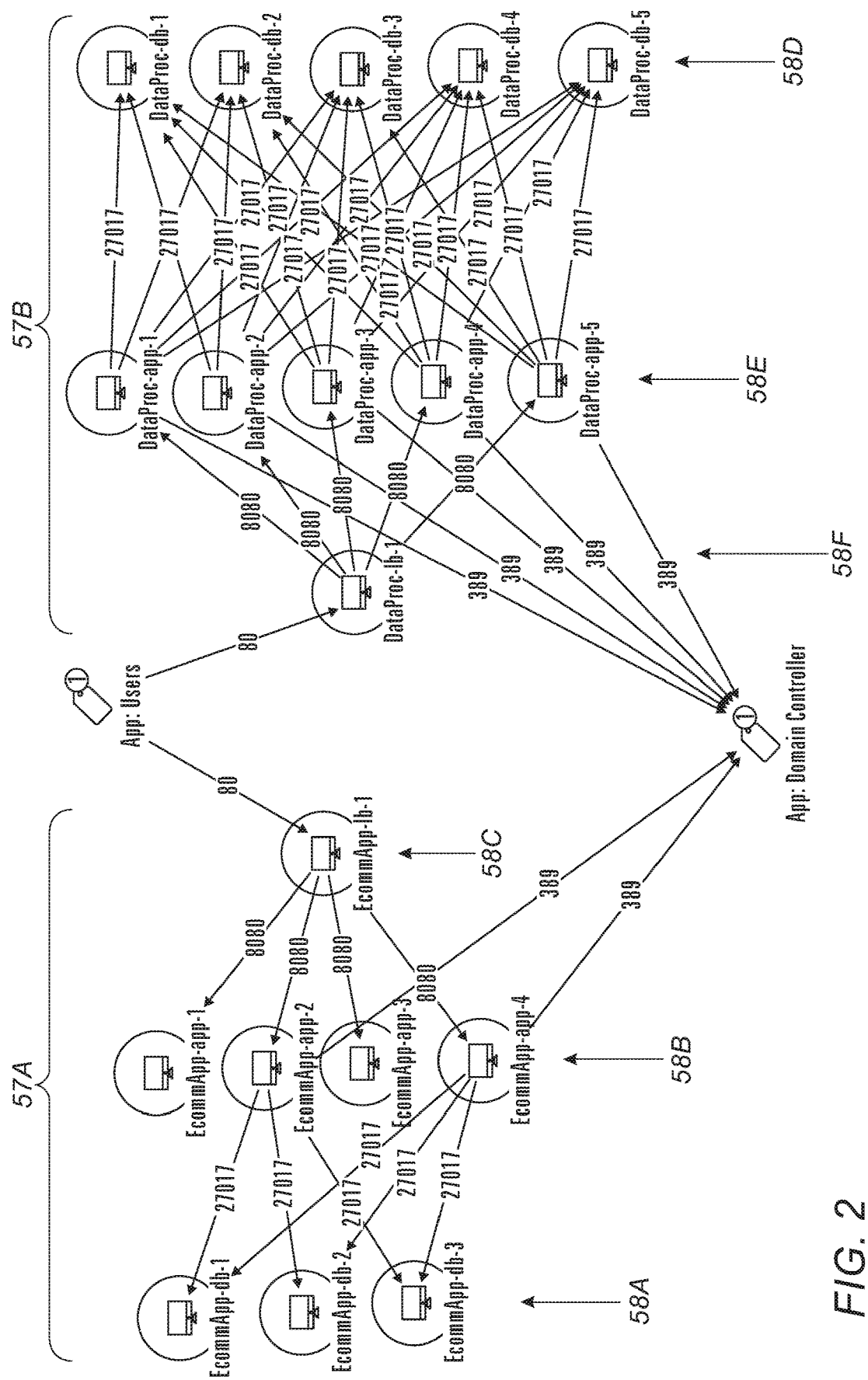
FIG. 2 is a diagram that schematically illustrates a data center having several tiers and applications, in accordance with an embodiment of the present invention.

FIG. 2 is a diagram that schematically illustrates a data center, in accordance with an embodiment of the present invention. The figure shows a relatively small and simple data center, for demonstrating the concept of segmentation of VMs and VM groups into tiers and applications.

The data center of FIG. 2 comprises multiple VMs 36, shown as circles. Directed arrows in the figure denote Transmission Control Protocol (TCP) connections between VMs, each directed from a source VM to a destination VM. The number next to each arrow denotes the destination port number of the respective TCP connection.

As can be seen in the figure, the VMs are used for implementing an electronic commerce (e-commerce) application 57A and a data-processing application 57B. Within each application, the VMs are divided into tiers. The VMs in each tier are of a certain type, i.e., have a certain role or functionality.

For example, e-commerce application 57A comprises three tiers. A first tier 58A comprises three e-commerce database ("EcommApp-db") VMs. A second tier 58B comprises four e-commerce application server ("EcommApp-app") VMs. A third tier 58C comprises an e-commerce load-balancer ("EcommApp-lb") VM. Data-processing application 57B also comprises three tiers. A first tier 58D comprises five data-processing database ("DataProc-db") VMs. A second tier 58E comprises five data-processing application server ("DataProc-app") VMs. A third tier 58F comprises a data-processing load-balancer ("DataProc-lb") VM. In addition, a Domain Controller and the users are also modeled as applications.

The applications and tiers shown in FIG. 2 are depicted purely by way of example. The disclosed techniques can be used with any other suitable types of tiers and/or applications. Applications may comprise, for example, Mail (e.g., Microsoft Exchange), logging and search (e.g., Splunk), visitor management systems, client/patient information systems and e-commerce websites. Tiers may comprise, for example, databases (e.g., MongoDB, MySQL), message queues (e.g., Kafka, RabbitMQ), Web servers (e.g., Apache HTTP Server, Microsoft IIS), FTP servers, backups and proxies. The above applications and tiers are non-limiting examples.

The simplified example of FIG. 2 demonstrates that the segmentation of VMs into tiers and applications conveys valuable information regarding the structure of the data center. This information is especially valuable, and difficult to attain, in large data centers that may comprise thousands of VMs and hundreds of applications.

Automatic Segmentation into Tiers and Applications

Figure 3:
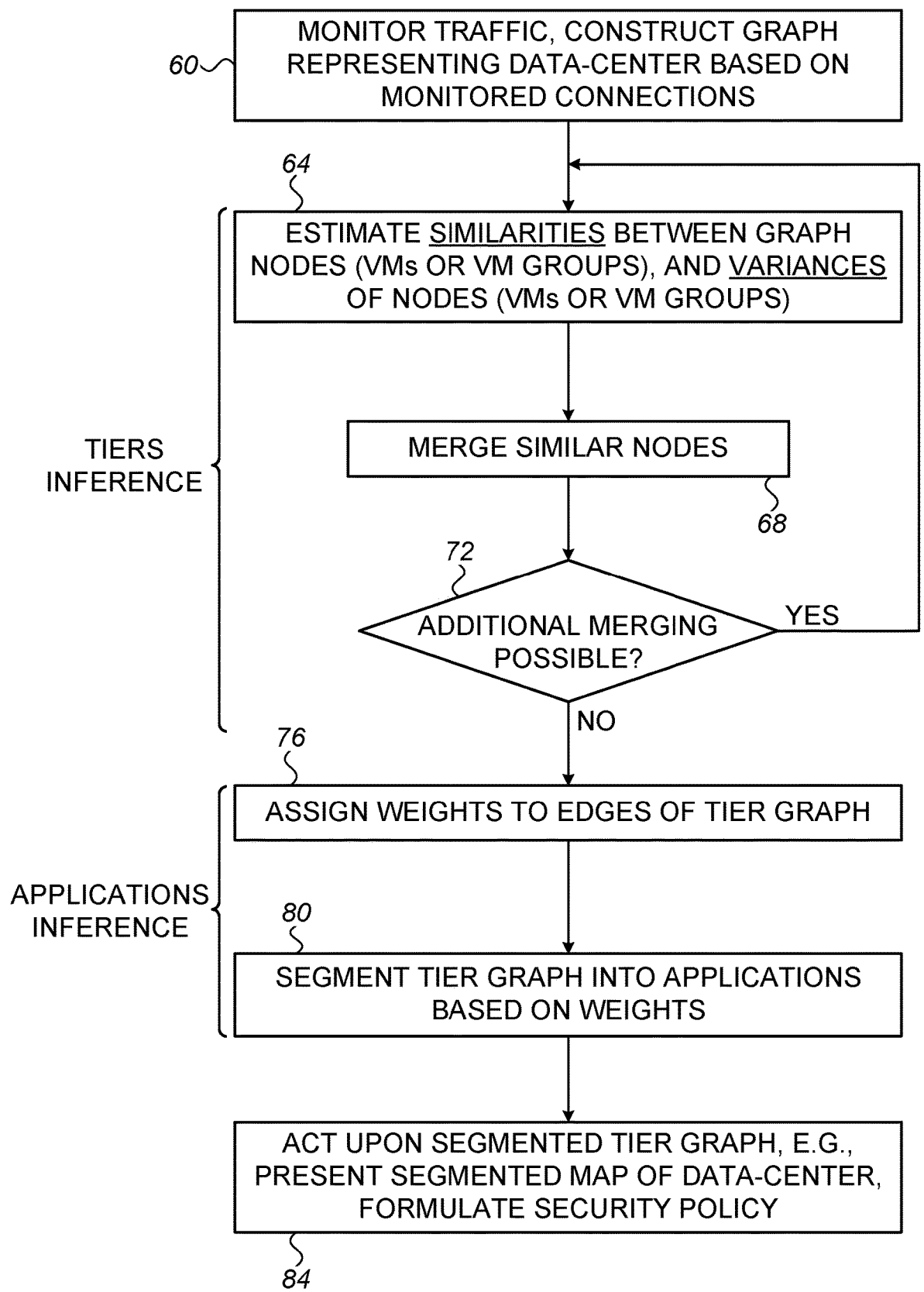
FIG. 3 is a flow chart that schematically illustrates a method for segmenting Virtual Machines (VMs) in a data center into tiers and applications, in accordance with an embodiment of the present invention.

FIG. 3 is a flow chart that schematically illustrates a method for segmenting VMs 36 in a data center into tiers and applications, in accordance with an embodiment of the present invention. By way of example, the description refers to data center 20 of FIG. 1, in which case the method is carried out by processor 53 of system 50. As noted above, the description that follows refers to VMs, purely by way of example. The disclosed techniques are applicable to any suitable types of workloads, including physical and virtual machines.

Traffic Monitoring and Initial Graph Construction

The method begins with processor 53 monitoring the communication traffic of VMs 36, and constructing a graph of VMs and connections, at a graph construction step 60. Typically, each agent 56 monitors the TCP connections it is able to intercept. For each connection, the agent records a triplet comprising the source VM, the destination VM and the destination port number used in the connection. Note that, typically, agents 56 record only the destination port number, and ignore the source port number. In the description that follows, unless specified explicitly otherwise, destination port number is referred to simply as "port number" or "port" for brevity.

Each agent 56 sends the recorded triplets to processor 53. Processor 53 collects the information from the various agents 56 over a certain period of time, e.g., several days. From the collected information, processor 53 constructs a directed graph that represents the various VMs 36 in data center 20 and the TCP connections between them.

Initially, each node in the graph represents a VM, and each edge in the graph represents one or more TCP connections on a certain destination port between two VMs. In other words, if multiple connections exist between two nodes on the same destination port number, all these connections are represented in the graph by a single edge. Each edge is directed from the VM that serves as the source of the connection to the VM that serves as the destination of the connection. Each edge is assigned an attribute that specifies the destination port number used in the respective TCP connection(s).

Clustering VMs into Tiers

At steps 64-72 of the method, processor 53 carries out an iterative process of clustering VMs 36 (or equivalently, clustering the nodes of the connections graph) into tiers. The tiers in turn serve as building blocks of the data-center applications. Initially, each node in the connections graph represents a single VM. Later in the clustering process, processor 53 merges nodes with one another, such that a node may represent a group of VMs.

The goal of the clustering process is that, once completed, each node of the graph will represent a tier, i.e., a group of one or more VMs that perform a specific role within a certain application. The resulting graph (derived from the connections graph by the clustering process of steps 64-72) is referred to as a tier graph.

For simplicity, the phrase "node X is connected to node Y" means that at least one VM in node X has a TCP connection with a VM in node Y. The phrases "communicates with" and "has a TCP connection with" are used interchangeably. Nodes that are connected by a TCP connection, i.e., directly connected by an edge of the graph, are also referred to as "neighbor nodes."

The clustering process is based on two interrelated properties of the nodes in the connections graph (VMs or VM groups)—similarity and variance. Variance is also referred to as noise. Processor 53 calculates similarities for various node pairs, and variances for various nodes, iteratively.

The similarity between two nodes quantifies the extent to which the two nodes have significant connections with the same neighbor nodes using the same destination ports. Consider, for example, the VMs "EcommApp-app-2" and "EcommApp-app-4" in tier 58B of FIG. 2. These two VMs have connections on port 27017 with the same VMs ("EcommApp-db-1", "EcommApp-db-2" and "EcommApp-db-3"), and also on port 8080 with the same VM ("EcommApp-lb-1"). As such, the similarity between "EcommApp-app-2" and "EcommApp-app-4" is high.

The variance of a node has to do with the heterogeneity of the neighbor nodes it communicates with on a certain port (e.g., the number of different neighbor nodes). A node that has connections with many non-similar neighbor nodes on the same destination port number is considered "noisy," in the sense that it may distort similarity estimations. In other words, the fact that a "noisy" node is a neighbor of two nodes does not add significance to the genuine similarity between the two nodes. As will be explained below, the similarity estimation process typically gives lower weight to noisy nodes.

One typical example of a noisy node is a node (VM or VM group) representing an infrastructure service, e.g., an anti-virus or a domain controller. Consider, for example, the Domain Controller node at the bottom of FIG. 2. Due to the service it provides, the Domain Controller has TCP connections on the same port (port 389) with many different nodes, both in application 57A and in application 57B. As such, the Domain Controller node at (incoming) port 389 should be given a very small weight in estimating similarities between nodes, or even be omitted altogether from the similarity estimation.

In some embodiments, processor 53 calculates, for a given node in the graph and a given destination port number, source variances denoted srcVar and destination variances denoted dstVar. The source variance srcVar of the given node is indicative of the number of non-similar neighbor nodes, which have TCP connections using the given port with the given node, in which the given node serves as the source of the connection. Thus, a node, which serves as the source in TCP connections with many different neighbor nodes on a given destination port number, will be assigned a high srcVar for that port number.

The destination variance dstVar of the given node is indicative of the number of non-similar neighbor nodes, which have TCP connections using the given port with the given node, in which the given node serves as the destination of the connection. Thus, a node, which serves as the destination in TCP connections with many different neighbor nodes on a given destination port number, will be assigned a high dstVar for that port number.

As can be seen from the above definitions, variance and similarity are interrelated. For example, when estimating similarity between nodes, which involves evaluating the commonality of connections with neighbor nodes, it is desirable to give small weight to neighbor nodes having large variance. The variance, on the other hand, depends on the similarity measures between pairs of neighbor nodes.

At a similarity & variance calculation step 64, processor 53 calculates similarities and variances for the current graph. In each execution of step 64, processor 53 performs three calculation phases:

I. Calculation of similarities based on the currently-known variances. In the very first execution of step 64, the variances are all assumed zero. In subsequent executions, the variances are taken from the output of phase II of the previous execution.

II. Calculation of variances based on the similarities calculated at phase I above.

III. Another calculation of similarities based on the variances calculated at phase II above.

In some embodiments, for calculating the similarities based on variances (phase I or III), processor 53 performs the following sequence of operations:

In each node, assign each edge (which connects the node to a neighbor node) a respective weight. Each edge is thus assigned two weights—one by the node serving as source, and one by the node serving as destination. Since each edge is associated with a specific destination port, the weights are associated with a specific destination port as well.

For an edge e that connects nodes u and v at port p, the weight assigned to this edge by node u is denoted $W_u(e)$, and the weight assigned to this edge by node v is denoted $W_v(e)$.

The weight assigned in a given node to an edge depends on the variance of the neighbor node at the far side of the edge. If the given node is the source of the connection, then the destination variance (dstVar) of the neighbor node is considered. If the given node is the destination of the connection, then the source variance (srcVar) of the neighbor node is considered.

The weight assigned to an edge e may also depend on the number of original edges (individual connections in the original graph) merged to form the edge (denoted e.count), and on the numbers of original nodes (individual VMs) merged to form the nodes connected by the edge (denoted u.size and v.size). The weight may also be related to the global significance of the port number (i.e., inversely related to the global noisiness or global variance of the port number).

In an embodiment, the weight is thus given by $W_v(e)=(1-\text{var})^\alpha \cdot \text{e.count}/\text{u.size}/\text{v.size}$.

In each node, normalize the weights of the various edges connected to the node so that the sum-of-squares of the weights, per node, equals unity ($\Sigma w^2=1$).

Calculate the similarity for each pair of nodes. The similarity measure considers all the connections involving each node. For example, for each pair of nodes:

Identify similar connections, i.e., connections from the two nodes in the pair to the same neighbor node on the destination port number being considered.

For every identified similar connection, multiply the two weights given to the corresponding similar connections by the two nodes in the pair (i.e., calculate the product $W_v(e1) \cdot W_u(e2)$).

Sum these products over all the pairs of similar connections of this node pair, so as to produce the similarity between the nodes in the pair.

In some embodiments, for calculating the variances based on similarities (phase II), processor 53 performs the following sequence of operations, per node and port number (as noted above, for any given node the variance is defined per destination port number, and per direction):

Calculate the destination variance dstVar of the node:
Identify the set of neighbor nodes that (i) are connected to the node on the port number being examined, and (ii) serve as sources in these connections.

Find the largest dissimilarity between nodes in the set, in accordance with a predefined metric.

Dissimilarity is typically defined as 1-similarity, wherein similarity has been defined above. In one embodiment, processor 53 finds the node pair having the largest dissimilarity in the set. In another embodiment, processor 53 considers some percentile (e.g., 90%) of the dissimilarity in the set. Other suitable dissimilarity metrics can also be used. The resulting largest dissimilarity is taken to be the destination variance (dstVar) of the node being evaluated.

Calculate the source variance srcVar of the node:
Identify the set of neighbor nodes that (i) are connected to the node on the port number being examined, and (ii) serve as destinations in these connections.

Find the largest dissimilarity between nodes in the set, in accordance with a predefined metric. Dissimilarity is typically defined as 1-similarity, wherein similarity has been defined above. In one embodiment, processor 53 finds the node pair having the largest dissimilarity in the set. In another embodiment, processor 53 considers some percentile (e.g., 90%) of the dissimilarity in the set. Other suitable dissimilarity metrics can also be used. The resulting largest dissimilarity is taken to be the source variance (srcVar) of the node being evaluated.

As noted above, at step 64 processor 53 performs a sequence of three calculations—(i) calculates similarities for the most-recently-known variances, (ii) calculates variances for the calculated similarities, and (iii) recalculates similarities for the calculated variances. This three-phase calculation yields accurate estimation of the node similarities and variances. In alternative embodiments, processor 53 may perform a larger number of variance and similarity calculations before attempting to merge nodes. Further alternatively, processor 53 may repeat the variance computation alone, e.g., in the very first iteration of steps 64-72 (i.e., before the first merging attempt).

Now, at a merging step 68, processor 52 attempts to merge nodes of the graph with one another. In one embodiment, processor 52 merges together any pair of nodes whose similarity is larger than a predefined threshold. As explained above, these similarities depend on the node variances, and therefore already account for noisy nodes. Typically, when merging two nodes, processor 53 merges their edges, as well, forming new edges between the new nodes. Each new edge comprises the old edges having the relevant port and direction.

In an embodiment, when merging two nodes to produce a merged node, processor 53 sets the destination variance of the merged node (per port) to be the maximum of the destination variances (for that port) of the two nodes being merged. Similarly, processor 53 sets the source variance of the merged node to be the maximum of the source variances of the two nodes.

At a completion checking step 72, processor 53 checks whether additional merging of nodes is possible. For example, processor 53 may check whether any nodes have actually been merged at step 68. If so, the method loops back to step 64 above, and processor 53 begins another iteration of similarity and variance calculation followed by an attempt to merge nodes.

Otherwise, i.e., if the current similarities between nodes are too low to allow additional merging, processor 53 terminates the iterative clustering process of steps 64-72. At this stage, each node in the graph represents a tier, which is part of an application.

Grouping Tiers into Applications

In the next stage of the method of FIG. 3, comprising steps 76-80, processor 53 groups together tiers of the tier graph into applications. At a weight assignment step 76, processor 53 assigns a respective weight to each edge of the tier graph.

In an embodiment, the weight assigned to an edge depends on one or more of (i) the variances of the nodes connected by the edge, for the relevant port, (ii) the count of original edges, of the original connections graph, which were merged to form the edge in question, and (iii) the count of original nodes of the original connections graph (VMs), which were merged to form the nodes connected by the edge. Alternatively, processor 53 may assign weights to the edges in any other suitable way, e.g., ignore the per-node (and port) variance values, and/or use the global per-port variance.

At an application segmentation step 80, processor 53 groups the tiers (the nodes in the tier graph) into applications, based on the weights assigned to the edges of the tier graph.

In one embodiment, processor 53 compares the weights to a predefined threshold. If the weight of an edge is above the threshold, processor 53 considers the nodes (tiers) connected by the edge as belonging to the same application. If the weight of an edge is below the threshold, processor 53 considers the weight too low for regarding the nodes (tiers) connected by the edge as belonging to the same application. (In some cases the nodes may still be regarded as belonging to the same application, but not via the edge in question. For example, the two nodes may be connected indirectly via one or more other nodes, by a path of edges whose weights exceed the threshold.)

In other embodiments, processor 53 may use any other suitable technique for grouping the tiers into applications based on the weights assigned to the edges of the tier graph. Many clustering processes are known in the art, and any such suitable process can be used for this purpose. Example processes are graph community-detection processes such as the Fast Louvain algorithm.

At this stage, processor 53 has produced a graph in which (i) VMs 36 of data center 20 are grouped in tiers, and (ii) the tiers are grouped into applications. FIG. 2 above illustrates a visual example of such a graph. In various embodiments, processor 53 may act upon the resulting graph in any suitable way, for any suitable purpose, at an action step 84.

In one embodiment, processor 53 uses the segmentation into tiers and applications to formulate security rules or policies for data center 20. A security rule may specify, for example, which applications are permitted to communicate with one another, and which are not. A connection that violates this rule may be suspected as a hostile attack and may be reported and/or blocked.

In another embodiment, processor 53 presents the segmentation into tiers and applications to an operator, e.g., a system administrator. A presentation of this sort (typically showing tiers and applications instead of individual VMs, and connections between tiers instead of connections between individual VMs) provides the operator with enhanced visibility into the structure of the data center, and enables simpler and more effective management.

The method of FIG. 3 is an example method that is depicted purely for the sake of conceptual clarity. In alternative embodiments, processor 53 may use other suitable methods for clustering VMs into tiers and then group the tiers into applications.

Figure 4A:
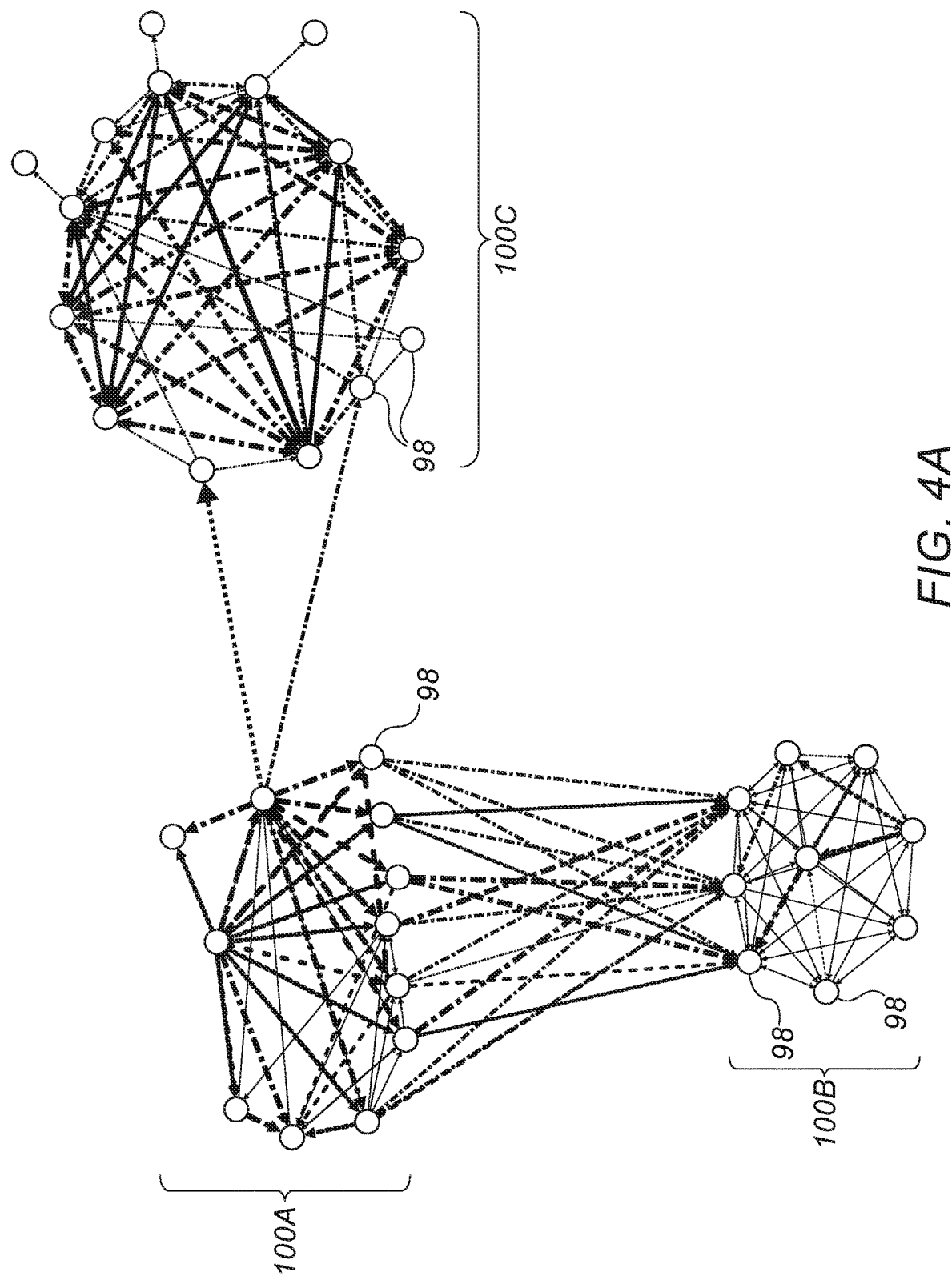
FIGS. 4A and 4B are diagrams that schematically illustrate segmentations of a data center into tiers and applications, in accordance with an embodiment of the present invention.
Figure 4B:
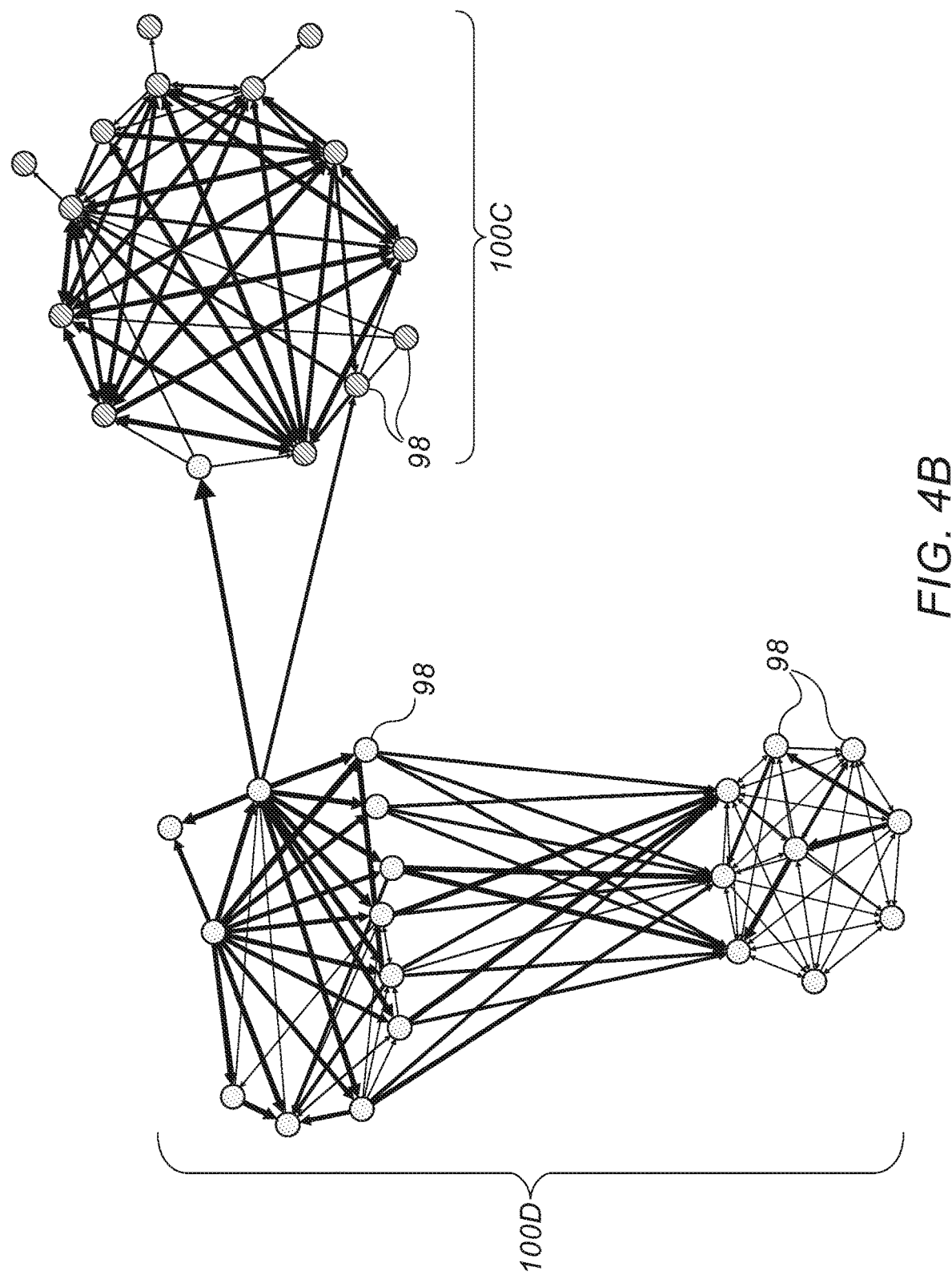

FIGS. 4A and 4B are diagrams that schematically illustrate two different segmentations of the same data center into tiers and applications, in accordance with an embodiment of the present invention. FIG. 4A shows an example segmentation when using the method of FIG. 3 above. FIG. 4B shows the result of a conventional segmentation process that does not consider port numbers. A comparison between FIGS. 4A and 4B demonstrates the effectiveness of the disclosed technique, and in particular the effectiveness of considering destination port numbers in the segmentation process.

In both figures, nodes 98 represent VMs, and edges represent TCP connections. In FIG. 4A, the port number of a connection is visualized by a respective line-style of the corresponding edge. The method of FIG. 3 enabled processor 53 to distinguish accurately among three different applications 100A, 100B and 100C.

In particular, the consideration of port enabled processor 53 to distinguish between applications 100A and 100B, even though the two applications have many connections connecting between them. In FIG. 4B, which was produced without considering port numbers, applications 100A and 100B were erroneously decided to be a single application 100D.

Additional Embodiments and Variations

In some embodiments, before beginning the clustering of VMs into tiers (e.g., steps 64-72 of FIG. 3), processor 53 may identify clusters of VMs having some predefined characteristics, and cluster them a-priori into the same tier. For example, processor 53 may identify in the graph a group of nodes (VMs) that communicate with one another using the same destination port number. This sort of group can be clustered together in advance, as it is likely to belong to the same tier.

In an embodiment, processor 53 prevents external nodes (workloads external to the data center) from merging during the segmentation process. In this manner, external workloads will not become part of any tier or application.

In some embodiments, in addition to specifying variance per {node, port}, processor 53 may specify a global variance measure for a certain destination port number. This global variance measure quantifies the "noise level" of the destination port number over the entire data center, not in relation to any individual node. Processor 53 may use the global variances as factors in calculating similarities between nodes, in clustering nodes, in assigning weights, and the like. For example, if a certain service port number is known a-priori to be noisy, it can be excluded from the calculations to begin with.

In some embodiments, when calculating the similarity between two nodes, processor 53 may first calculate the similarity per destination port number. Processor 53 amplifies (scales) the similarity measure of a given port as a function of the number of edges corresponding to this port number. The amplified similarity measures are then summed over all ports. This technique enables, for example, assigning a higher similarity measure in cases where not all neighbors (for a certain port) are shared between the two nodes, for example due to load balancers.

In many practical cases, some connections are monitored by agents 56 on both sides of the connection, whereas other connections are monitored on only one side (either at the source or at the destination). For example, a connection between a VM 36 and an external server 44 is typically monitored only on the VM side. Connections between VMs 36, on the other hand, are typically monitored on both sides. Even internally in the data center, some connections may be monitored only on one side, e.g., because a certain server 24 may not have an installed agent, for any reason.

The existence of two types of connections (monitored on both sides vs. on one side only) may distort the similarity and variance calculations, and thus may degrade the clustering performance. In some embodiments, processor 53 distinguishes between the two types of connections, and compensates for this difference as part of the calculations.

In some embodiments, processor 53 runs a process that automatically assigns meaningful names to the tiers and/or applications that are presented to the operator. Typically, processor 53 derives the name of a tier/application from the names of the underlying workloads. Processor 53 may attempt to assign a name that is (i) sufficiently indicative of the names of the underlying workloads, and (ii) sufficiently different from other names. Additional implementation detail of example naming processes are given in U.S. Provisional Patent Application 62/469,136, cited above.

As part of the naming process, processor 53 may attach a tag such as "infrastructure" to an application that serves a large number of other applications (e.g., more than three standard deviations above the average number). Processor 53 may attach a tag such as "monitor" to applications that contact many other application, and a tag such as "hub" to applications that serve and contact many other applications (intersection of "monitor" and "infrastructure" applications). This tagging helps the operator understand the nature of the application, and draws his or her attention to applications that serve many other applications.

In some embodiments, processor 53 does not consider a connection between two nodes as either existent or non-existent, but rather defines some non-binary metric for the strength of the connection. The metric may consider, for example, the number of TCP connections between nodes, the period of time a connection exists, or other suitable factors. Processor 53 may use such non-binary metrics as factors in the clustering process, e.g., in calculating similarities, variances or weights.

In some embodiments, processor 53 specifies a set of port numbers as being considered a single port. For example, ports 139 and 445 may be bundled together and regarded as a single port throughout the disclosed techniques.

In some embodiments, processor 53 prevents nodes having very small total connection weights from being considered in the similarity calculations. For example, processor 53 may define a threshold on the total connection weight of a node. If the total connection weight of a node falls below the threshold, processor 53 nulls the total connection weight to zero.

In some embodiments, before beginning the clustering process, processor 53 merges together unmonitored workloads (workloads having no agent 56 that monitors their connections locally) having the exact same connections. This merging reduces computational complexity.

In some embodiments, processor 53 comprises multiple parallel processing cores. Processor 53 may parallelize computationally-intensive computations, e.g., variance, similarity and/or naming calculations among its processing cores. Parallelization of similarity calculation may be performed by splitting the set of all possible pairs of nodes (nodes having at least one common neighbor) into non-overlapping subsets each analyzed by a different process or thread. Parallelization of variance calculation may be performed by splitting the set of node and port pairs (per direction: incoming and outgoing) into non-overlapping subsets each analyzed by a different process or thread. Parallelization of naming calculation may be performed by splitting the set of all groups of nodes into non-overlapping subsets each analyzed by a different process or thread.

Although the embodiments described herein mainly address clustering of machines into tiers and applications to aid network segmentation, the methods and systems described herein can also be used in other applications, such as in clustering the various processes running in the various machines in the data center (by representing each process by a node), thereby supporting applications that run on a shared machine.

In some embodiments, the disclosed techniques may take advantage of inputs such as server names, VLAN ids, placement of workloads in hypervisors, and other orchestration data as well as machines internal information (e.g., process lists, user logins, etc.), to improve similarity estimation between machines. For example, such external information can be used for deriving an initial, high-level segmentation of the data center. The disclosed techniques can then be used for further refining this initial segmentation.

As yet another example, segmentation results can be used for discovering applications, e.g., in order to assist in data-center migration and cleanup of obsolete resources. Additionally or alternatively, segmentation results can be used for optimizing machine placement in accordance with, for example, application data privacy requirements or network bottlenecks. As still another example, segmentation results can be used for detecting anomalies in the data center, e.g., by considering new flows or new application clustering that deviate from older application clustering.

As another example, final and/or intermediate segmentation results can be used in a semi-automatic manner, as a recommendation tool that assists a human operator to quickly define groups of similar VMs (for example by making progressive suggestions based on the VMs and groups the user marked and grouped so far).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   an interface, configured to receive attributes of communication connections of multiple workloads running in a computing system; and
   a processor, configured to collect for each given workload of the multiple workloads, information on the communication connections of the given workload with other workloads, to identify tiers of given workloads that have similar collections of communication connections with other workloads, to assign weights to the communication connections between the tiers, to combine the tiers into groups responsive to the weights of the connections between the tiers, and to provide indication of the workloads in each group, for management of the computing system,
   wherein in identifying given workloads that have similar collections of communication connections with other workloads, the processor calculates for each pair of workloads a similarity measure, and clusters, into a same tier, workloads having a similarity measure above a threshold.

2. The apparatus according to claim 1, wherein, for each communication connection, the attributes consist of a source workload, a destination workload and a destination port number.

3. The apparatus according to claim 1, wherein the processor is configured to cluster the workloads into the tiers in an iterative process.

4. The apparatus according to claim 3, wherein the processor is configured to:
   calculate (i) similarity measures that quantify an extent to which pairs of the workloads have significant connections with same neighbor workloads using a same destination port number, and (ii) variance measures that quantify an extent to which workloads add significance to the similarity measures; and
   cluster the workloads into the tiers based on the similarity measures and the variance measures.

5. The apparatus according to claim 1, and comprising multiple software agents, which are installed in the computing system and are configured to monitor the communication connections and to send the attributes to the processor.

6. The apparatus according to claim 1, wherein the processor is configured to formulate a security policy for the computing system based on the groups of the workloads, and to carry out security tasks in accordance with the formulated security policy.

7. The apparatus according to claim 1, wherein the processor is configured to present the groups of the workloads to an operator.

8. The apparatus according to claim 7, wherein in presenting the groups of workloads to an operator, the processor assigns a meaningful name for each group as a function of the workload names inside the group and outside the group.

9. The apparatus according to claim 1, wherein the similarity measure is indicative of an extent to which the workloads of the pair have significant connections with same neighbor workloads using same destination ports.

10. The apparatus according to claim 1, wherein in calculating the similarity measure, the processor identifies in the collected communication connections of the pair of workloads, shared connections to same neighbors, and assigns the similarity measure as a sum of values assigned to the identified shared connections.

11. The apparatus according to claim 10, wherein in identifying given workloads that have similar collections of communication connections with other workloads, the processor assigns variance measures to the workloads and/or ports, and the values assigned to each identified shared connection is a function of the variance measure of a far side of the shared connection.

12. The apparatus according to claim 11, wherein the variance measures of each given workload and/or port, is a function of the similarity measures calculated for the pairs of the workloads connected to the given workload with the given port.

13. The apparatus according to claim 11, wherein in assigning the variance measures of each given workload and/or port, the processor assigns the variance measures as a function of similarity measures between the pairs of workloads connected to the given workload with the given port, wherein the function gives less weight to pairs of workloads having one monitored workload and one non-monitored workload.

14. The apparatus according to claim 1, wherein in identifying given workloads that have similar collections of communication connections with other workloads, the processor assigns variance measures to the workloads and/or ports, and calculates the similarity measures as a function of the variance measures of the far sides of the communication connections shared by the given workloads.

15. A method, comprising:
receiving attributes of communication connections of multiple workloads running in a computing system;
based on the attributes, automatically segmenting the multiple workloads into groups, wherein the workloads in a given group collectively run a respective application; and
acting upon segmentation of the workloads into the groups
wherein automatically segmenting the multiple workloads into groups comprises:
collecting for each given workload of the multiple workloads, information on the communication connections of the given workload with other workloads;
identifying tiers of given workloads that have similar collections of communication connections with other workloads;
assigning weights to the connections between the tiers; and
combining the tiers into groups responsive to the weights of the connections between the tiers,
wherein identifying tiers of given workloads that have similar collections of communication connections with other workloads comprises merging workloads identified as belonging to a same tier, into a single node.

16. The method according to claim 15, wherein, for each communication connection, the attributes consist of a source workload, a destination workload and a destination port number.

17. The method according to claim 15, wherein clustering the workloads into the tiers comprises iteratively clustering the workloads into the tiers.

18. The method according to claim 17, wherein clustering the nodes into the tiers comprises:
calculating (i) similarity measures that quantify an extent to which pairs of the workloads have significant connections with same neighbor workloads using a same destination port number, and (ii) variance measures that quantify an extent to which workloads add significance to the similarity measures; and
clustering the workloads into the tiers based on the similarity measures and the variance measures.

19. The method according to claim 15, and comprising collecting the attributes of the communication connections by multiple software agents, which are installed in the computing system and monitor the communication connections.

20. The method according to claim 15, wherein acting upon the segmentation comprises formulating a security policy for the computing system based on the segmentation of the workloads into the groups.

21. The method according to claim 15, wherein acting upon the segmentation comprises presenting the segmentation of the workloads into the groups to an operator.

22. A computer software product, the product comprising a tangible non-transitory computer-readable medium in which program instructions are stored, which instructions, when read by a processor, causes the processor to:
receive attributes of communication connections of multiple workloads running in a computing system; and
automatically segment the multiple workloads into groups based on the attributes of the communication connections, wherein the workloads in each group collectively run a respective application wherein automatically segmenting the multiple workloads into groups comprises:
collecting for each given workload of the multiple workloads, information on the communication connections of the given workload with other workloads;
identifying tiers of given workloads that have similar collections of communication connections with other workloads;
assigning weights to the connections between the tiers; and
combining the tiers into groups responsive to the weights of the connections between the tiers, wherein in identifying tiers of given workloads that have similar collections of communication connections with other workloads, the processor identifies groups of workloads that have incoming connections with a same destination port and from a source workload inside the group.

23. The product according to claim 22, wherein, for each communication connection, the attributes consist of a source workload, a destination workload and a destination port number.

24. An apparatus, comprising:
an interface, configured to receive attributes of communication connections of multiple workloads running in a computing system; and
a processor, configured to collect for each given workload of the multiple workloads, information on the communication connections of the given workload with other workloads, to identify tiers of given workloads that have similar collections of communication connections with other workloads, to assign weights to the communication connections between the tiers, to combine the tiers into groups responsive to the weights of the connections between the tiers, and to provide indication of the workloads in each group, for management of the computing system,
wherein in identifying given workloads that have similar collections of communication connections with other workloads, the processor merges workloads identified as belonging to a same tier, into a single node.

25. The apparatus according to claim 24, wherein the single node is considered in following iterations as having a size which is a function of a number of merged workloads into the single node, and wherein the processor assigns variance measures to the workloads and ports and calculates the similarity measures as a function of the variance measure and size of the far side of the communication connections shared by the given workloads.

26. An apparatus, comprising:
an interface, configured to receive attributes of communication connections of multiple workloads running in a computing system; and
a processor, configured to collect for each given workload of the multiple workloads, information on the communication connections of the given workload with other workloads, to identify tiers of given workloads that have similar collections of communication connections with other workloads, to assign weights to the communication connections between the tiers, to combine the tiers into groups responsive to the weights of the connections between the tiers, and to provide indication of the workloads in each group, for management of the computing system,
wherein in identifying given workloads that have similar collections of communication connections with other workloads, the processor identifies groups of workloads that have incoming connections with a same destination port and from a source workload inside the group.

* * * * *